Aug. 31, 1937.  A. F. WILLIAMS  2,091,296
EYEGLASSES
Filed June 26, 1936  2 Sheets-Sheet 1
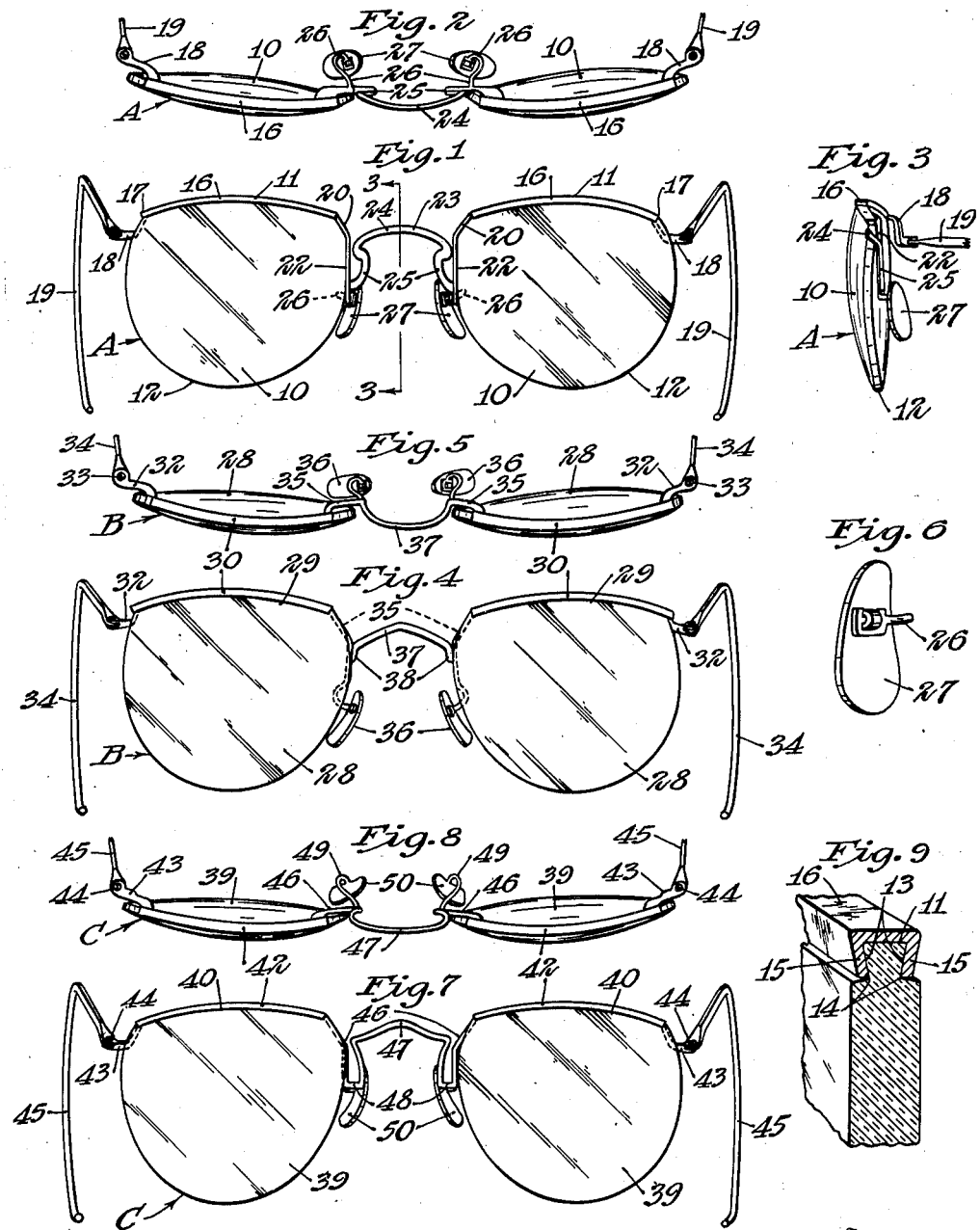
Inventor
Arthur F. Williams Aug. 31, 1937.  A. F. WILLIAMS  2,091,296
EYEGLASSES
Filed June 26, 1936  2 Sheets-Sheet 2
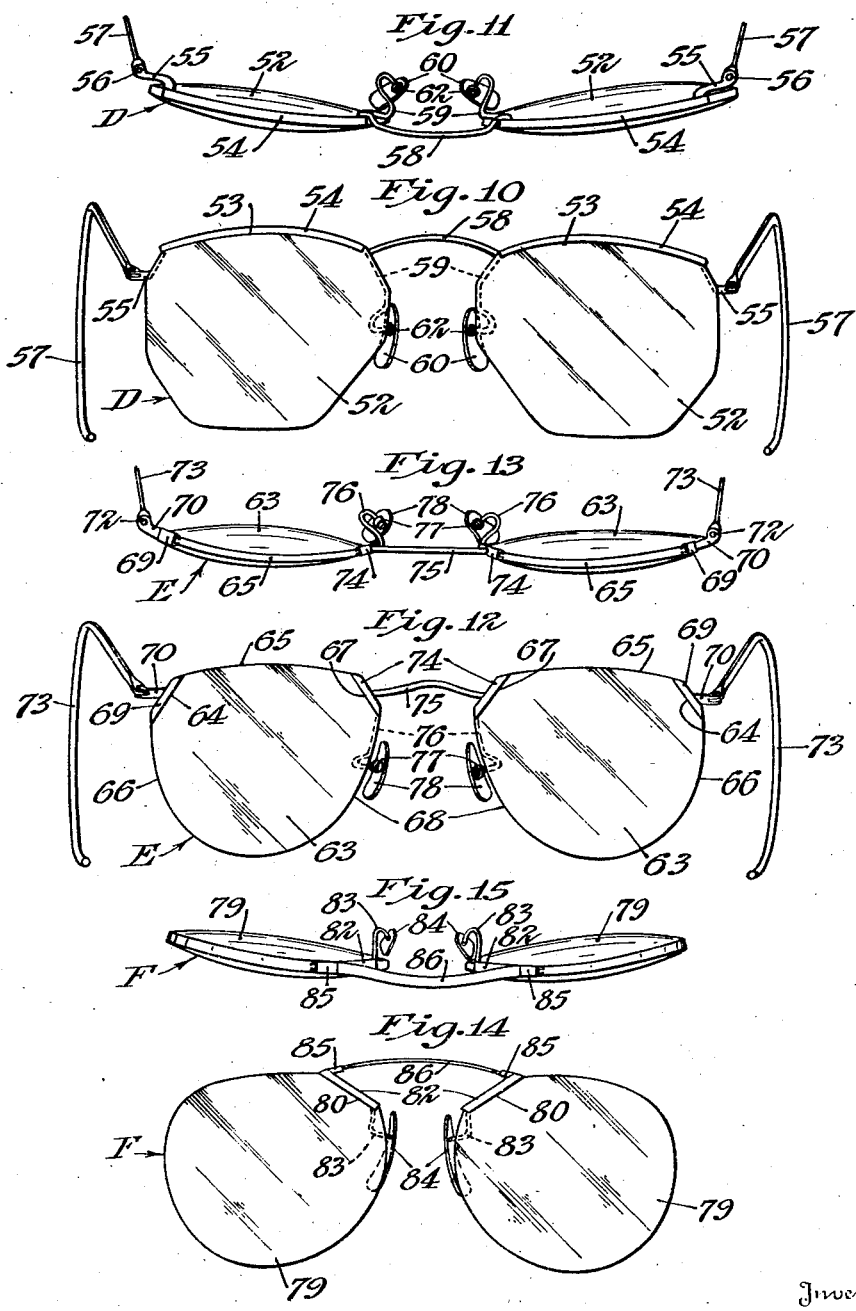

Patented Aug. 31, 1937

2,091,296

UNITED STATES PATENT OFFICE 2,091,296

EYEGLASSES

Arthur F. Williams, St. Paul, Minn.

Application June 26, 1936, Serial No. 87,373

10 Claims. (Cl. 88—47)

My invention relates to an improvement in eyeglasses of a type wherein the lenses are supported by the frame without the necessity of screws extending through the lenses.

In the past it has been common practice to support the lenses of eyeglasses or spectacles to the frame thereof by extending a flange over the front and rear surfaces of the lenses and by extending bolts through the lenses and through these flanges. Another common type of frame entirely encircled the lens so as to clamp the lens firmly within the frame. Some effort has been made to support eyeglasses and spectacles entirely from the top edge of the lenses by providing oppositely disposed grooves in the lenses and by providing a straight tubular member connecting the lenses which was slotted to receive the straight grooved edge of each lens. This type of construction, however, was only suitable for lenses having a straight edge.

It is the object of this invention to provide a construction wherein one edge of each lens is arcuated in accordance both with the outer contour of the lens and with the concavity of the lens. This edge is grooved so that it may be slidably engaged within a supporting channel frame. This frame forms a connection between the lenses and the bows if the glasses are of the spectacle type and between the lenses and the bridge portion of the frame.

It is a feature of my invention that by this type of construction virtually any shape, design, or contour of lens may be supported by a frame which extends throughout only a portion of the perimeter of the lens and yet which engages the lens securely. This clearly differentiates from former constructions wherein a straight edge was required on a substantially flat lens.

It is a feature of my invention that the glasses made in accordance with my invention are provided with strongly reinforced lenses. As the frame portions engage one edge of each lens along an arcuated line, the danger of breakage of the lens adjacent the frame is greatly decreased. Because of the fact that the channels engage the lenses along arcuated lines which have no inwardly extending projection for the accommodation of screws or the like, the bending of the frame with respect to the lenses will not create a greater tendency for the lenses to fracture at one particular point than at any other point. Any bending strain is accordingly distributed throughout the entire length of the engagement between the lenses and the channel supporting frames.

It is a further feature of my invention to provide a lens having a channel construction which permits a supporting channel frame to be used which is not substantially greater in thickness than the edge of the lens itself.

It is a further feature of my invention to demonstrate the manner in which my curved supporting channel frames may be used in conjunction with virtually any shape or type of lens or in the formation of any desired style of glasses.

These objects, together with other objects and novel features of my invention will be more clearly and fully set forth in the following specification and claims.

In the drawings:

Figure 1 is a front elevation view of one type of glasses, having the bridge portion thereof mounted to the frame in one manner.

Figure 2 is a top plan view of the glasses illustrated in Figure 1.

Figure 3 is a cross sectional view on the line 3—3 of the glasses illustrated in Figure 1.

Figure 4 is a front elevation view of a slightly different form of eyeglass construction from that illustrated in Figure 1.

Figure 5 is a top plan view of the glasses illustrated in Figure 4.

Figure 6 is a detail of the nose rest used in conjunction with the glasses.

Figure 7 is a front elevation view of a slightly different form of construction of glasses.

Figure 8 is a top plan view of the glasses of the type shown in Figure 7.

Figure 9 is a cross sectional view through a small portion of a lens disclosing the manner of the grooving and of supporting by my channel frame.

Figure 10 is a front elevation view of another slightly different form of construction of glasses.

Figure 11 is a top plan view of the glasses illustrated in Figure 10.

Figure 12 is a front elevation view of a slightly different form of frame construction.

Figure 13 is a top plan view of the glasses shown in Figure 12.

Figure 14 is a front view of a type of eyeglasses supported entirely by the nose of the wearer.

Figure 15 is a top plan view of the glasses illustrated in Figure 14.

The glasses A illustrated in Figures 1, 2 and 3, of the drawings, comprise a pair of lenses 10 having an arcuated upper edge 11 and a rounded lower edge 12. While the glasses are not of true oval or circular shape, they are virtually continuously rounded throughout most of the perimeter thereof.

The upper arcuated edge 11 is grooved as illustrated in Figure 9 of the drawings. The grooves 13 extend from a deepest portion 14 at a point spaced from the extreme edge of the lens outwardly along a slanting line 15 so as to form what might be termed a dove-tail connection with the channel frame 16.

As may be seen from an observation of Figures 1 and 2 of the drawings, the frame 16 along the grooved edge 11 of the lenses 10 is arcuated both with respect to the axis of the lens and with respect to the toric axis of the lenses. The curve of the frame portions 16 accordingly extend along a compound curve which is such that the lenses may readily slide into and out of the supporting channels before being cemented in place.

The extremities 17 of each of the frame portions 16 are provided with a hinge 18 integral with the side edge of the channel 16 by means of which the frame 16 may be attached to the bows 19 of the spectacles. The inner ends of the frame channels 16 are provided with extensions 20 which extend along the opposed edges of the adjacent ends of the lenses 10 to reinforce these edges 22 and to provide a point of contact to which may be connected the bridge portion 23.

The bridge 23 is provided with an outwardly and upwardly curved central connecting portion 24 which is connected by side portions 25 to the lower extremities of the portions 22 of the frame 16. Arms 26 also attached to the portions 22 of the frame provide an attachment with the nose rests 27. The manner in which nose rests 27 are pivotally connected to the arms 26 may be best seen in Figure 6 of the drawings.

The glasses B disclosed in Figures 4 and 5 of the drawings, discloses a pair of substantially continuously arcuated lenses which are provided with an upper edge 29 arcuated both with respect to the vertical and horizontal axis as may be seen from observation of Figures 4 and 5. Along these upper lens edges 29 are provided grooves 13 such as are illustrated in Figure 9 of the drawings. A continuously arcuated channel 30 incloses the extreme upper edge of each lens 28. Arm 32 attached to the side of each channel 30 at the outer extremity thereof supports a pivot 33 by means of which the channels 30 are connected to the bows 34. Attached to the inner extremity of each channel 30 I provide a downwardly extending arm 35 which is bent to provide a support for nose rests 36 similar to the nose rest 27 and pivotally connected to the arms 35 in a manner similar to that shown in Figure 6. The bridge 37 is secured to the downwardly extending arms 35 at 38 intermediate the ends of the arms 35.

In Figures 7 and 8 I provide a type of construction C somewhat similar to that shown in Figures 4 and 5. In this construction the lenses 39 are provided with arcuated upper edges 40 inclosed by arcuated channels 42. To one side of the channels 42 at the outer extremities thereof, are attached arms 43 which are pivotally connected at 44 to bows 45. At the inner extremity of each channel 42 is attached an arm 46 which extends downwardly a substantial distance and which is integral with the bridge 47, being connected thereto by a short offset 48. Arms 49 are provided to support nose rests 50.

The glasses D, disclosed in Figures 10 and 11 of the drawings, are provided with lenses 52 having the usual arcuated upper edge 53. The lenses 52 are a modified octagonal shape. In closing the upper arcuated edge 53 of each lens I provide a channel 54. Secured at the outer extremity of each channel 54, I provide an arm 55 pivotally secured at 56 to bows 57. To the inner ends of the channels 54 I directly attach an upwardly and outwardly arcuated bridge 58 secured to one side of the channels 54. Also secured to one side of each channel 54 I provide a downwardly extending arm 59 to which nose rests 60 are pivotally attached at 62.

The glasses E illustrated in Figures 12 and 13 differ somewhat from the types of glasses A, B, C, and D, in that in place of having a continuous channel extending over the entire upper edge of each lens, I provide lenses 63 having short grooved portions 64 adjacent the upper edge 65 of each lens 63 and adjacent the outer edge 66 of each lens. A short grooved portion 67 is also provided adjacent the upper edge 65 and adjacent the inner edges 68 of each lens 63. The grooved edges 64 and 67 of each lens are arcuated both with respect to the horizontal and vertical axis of the glasses. Short channels 69 engage the grooved edge 64 of each lens 63 and to each channel 69 is secured an arm 70 pivotally connected at 72 to bows 73. Engaging each grooved edge 67 I provide a channel 74. Between the channels 74 on the lenses 63 is connected a bridge 75 and also to each channel 74 is provided a downwardly extending arm 76 pivotally connected at 77 to a nose rest 78.

In Figures 14 and 15 I disclose a pair of glasses F which is to be supported entirely by the nose of the wearer. It should be understood that any of the above types of glasses could be used without the bows to provide eyeglasses such as are illustrated in Figures 14 and 15, but having a different configuration. The lenses 79 of the glasses F are provided with a short arcuated grooved edge 80. The grooved edge 80 is supported within an arcuated channel 82 to one end of which is secured an arm 83 supporting a nose rest 84. The other end of each channel 82 forms a socket 85 for one end of a spring nose bridge 86 connecting the channels 82.

It may be seen in each of the described forms of my invention that one edge of each lens is grooved along a line which is arcuated in two different directions. Furthermore, it may be seen that in each case, the edge of the lens is grooved as illustrated in Figure 9 so that the sides of the channel dove-tail into close relationship with the lens itself. When the lenses have been slidably inserted into proper position they are cemented in this position so that they will remain in any desired adjusted position in the channel. This is usually desirable because of the fact that the outside extremity of each channel is substantially open in order that the lens may be inserted and removed.

In accordance with the patent statutes I have described the principles of operation of my invention, and while I have endeavored to disclose the best embodiments thereof, I desire to have it understood that this is only illustrative of a means of carrying out my invention and that obvious changes may be made within the scope of the following claims:

I claim:

1. Glasses including a pair of lenses, an arcuated side thereon, an arcuate frame extending along said arcuate edges, and a tapered dove-tail connection between said frame and said lenses.

2. Glasses including a pair of lenses, grooves in each of said lenses parallel to one edge thereof, each groove tapering outwardly from its deepest point some distance from the lens edge to a point adjacent the edge of the lens, and a channel supporting means engageable over said edge, the sides of said channel engaging in said grooves in dove-tail relationship therewith.

3. Glasses including a pair of lenses, a groove in one of said lenses adjacent one edge thereof, said groove tapering from a point spaced from the adjacent lens edge to a point adjacent the lens edge, and a channel supporting means having opposed sides, one of said sides engaging in said groove to hold said lens and said supporting means together.

4. Glasses including a lens, a grooved edge thereon, a channel including opposed sides engageable with said grooved edge slidably longitudinally of said channel, and bow supporting means secured to one side of said channel to avoid interference with the sliding movement of said lens.

5. Glasses including a lens supporting frame including channel means, a pair of lenses each including a grooved edge longitudinally slidably engageable with said channel means, and bow supporting means secured to one side of said channel means to avoid interference with the sliding movement of said lenses.

6. Glasses including a lens supporting frame having a pair of channels connected by a bridge, lenses longitudinally slidably engageable with said channels, cooperating guide means on said lenses and channels holding said members longitudinally slidably engaged, and bow supporting means secured on one side of said channels out of the path of the lenses in their slidable engagement with said channels.

7. Glasses including a pair of channels, a bridge connecting said channels, said bridge connected to one side of said channels, lenses slidably engageable with said channels for support thereby, and cooperating guide means on said lenses and channels holding said members relatively longitudinally slidable.

8. Glasses including a pair of channels, a bridge connecting said channels, lenses slidably engageable with said channels, a second pair of channels engageable with said lenses at points spaced from said first channels, bow supporting means on said second pair of channels, and cooperating means on said lenses and channels holding said members relatively longitudinally slidable.

9. Glasses including a pair of lenses, channel means longitudinally slidably engageable with said lenses, cooperable means on said lenses and channel means holding said members relatively slidable longitudinally, said channel means having sides thereon, a bridge portion secured to one side of each of said channel means out of the path of the lenses in their slidable relation with said channel means, and bow supporting portions secured to said one side of said channel means out of the path of said lenses in their slidable relation with said channel means.

10. Glasses including a pair of lenses, a grooved edge on each of said lenses, a channel including edges engageable with said grooved edge on each of said lenses, sockets at the outer extremities of each of said channels, and spring means connecting said sockets and forming a connecting bridge between said channels.

ARTHUR F. WILLIAMS.